Oct. 17, 1967

T. E. PARDUE

RING OHMIC CONTACT MICROELECTRONIC COMPONENT SEPARATION METHOD

Filed May 25, 1964

3,347,430

INVENTOR.

TURNER E. PARDUE

BY

Robert J. Haase

ATTORNEY 3,347,430

RING OHMIC CONTACT MICROELECTRONIC COMPONENT SEPARATION METHOD

Turner E. Pardue, % Melpar, Inc., 7700 Arlington Blvd., Falls Church, Va. 22046

Filed May 25, 1964, Ser. No. 373,596
3 Claims. (Cl. 225—2)

The present invention relates to the fabrication of a multiplicity of microelectronic components on a single wafer of semiconductive material and, more particularly, to a method for separating the finished components from the wafer with a minimum of shrinkage or loss by damage.

As is now widely practiced in the art, a multiplicity of identical microelectronic components are fabricated at one time on a single parent wafer of semiconductive material. The multiple component fabrication technique fully exploits the mass production capabilities of modern masking, etching and diffusion techniques by which microelectronic components are produced and also facilitates handling during fabrication whereby a single relatively large wafer is processed rather than a multiplicity of individually much smaller ones. After the microelectronic components have been completed on the parent wafer, they are separated from each other usually by scribing and breaking. After the surface of the parent wafer has been scribed along lines between the individual microelectronic components, the scribed wafer is subjected to bending to break the wafer into pieces along the scribed lines. Obviously, the method by which the individual components are separated from the parent wafer is of great concern because the separation is undertaken only after the full production investment in the individual components has been completed.

Experience has shown that objectionably costly shrinkage results unless special care is exercised when the components are separated. Special care, however, may reduce shrinking but not without compromising fabrication cost. It is preferable that a way be found which minimizes component damage or loss during separation without significantly adding to the cost, complexity, or duration of the overall fabrication process.

It is a principal object of the present invention to provide a low cost method for separating individual microelectronic components from a parent wafer of semiconductive material with a minimum of loss.

Another object is to provide a method for protecting individual microelectronic components from damage while they are being separated from a single parent wafer.

A further object is to provide a method for protecting individual microelectronic components from damage while they are being separated from a single parent wafer without the introduction of any procedural step foreign to the fabrication of the components.

These and other objects of the present invention, as will appear from a reading of the following specification, are achieved by the provision of a component separation method which is fully compatible with conventional microelectronic component fabrication techniques. The individual components are produced in an ordinary way on a single parent wafer of semiconductive material and may comprise whole circuits. In the disclosed example, each of the individual components comprises a pair of matched NPN silicon planar transistors whose bases and collectors, respectively, are connected together through the wafer material. The transistors are adapted for use as an electronic chopper although the disclosed circuit and use are not exclusively associated with the present invention. The microelectronic circuit component per se is described and claimed in copending U.S. patent application S.N. 331,164, filed Dec. 17, 1963, now Patent No.

3,275,912, in the name of Hans J. Kunz, entitled "Microelectronic Chopper Circuit Having Symmetrical Base Current Feeds," and assigned to the present assignee.

At a point near the end of the fabrication process, the surface oxide coating is selectively removed from those wafer areas where ohmic contacts are to be deposited. Ordinarily, ohmic contacts are placed only at circuit locations requiring the establishment of electrical connections. In accordance with the present invention, however, the oxide layer also is removed along a closed path about the perimeter of each individual microelectronic circuit component. Then, during the same step wherein the ohmic contacts customarily are deposited on the circuit elements, additional material is deposited also about the aforesaid path. Preferably, the additional material is identical to the material with which ohmic contact is made to the circuit elements and is deposited through a mask whose aperture is somewhat wider than the aforesaid path. The result is that a ring-like configuration of additional ohmic contact material is deposited about the perimeter of each of the microelectronic circuit components so that the material directly contacts primarily the bare semiconductor material of each oxide etched path but also the inner abutting edge of oxide material. In certain applications the ohmic contact ring itself may be used as an electrical contact, for example, as the collector ohmic contact of planar transistors.

More importantly, the ohmic contact ring serves to protect both the oxide coating interior to the ring and the wafer material itself during the process by which the individual microelectronic circuit components are separated from each other. It has been found that the ohmic contact ring aids in preventing cracks that often occur in the oxide coating especially as a result of scribing and wafer breaking steps. It is of great importance that the oxide coating be maintained intact especially in the regions at which the PN junctions come to the surface of the wafer so that junction contamination is prevented. This is achieved in accordance with the present invention by scribing separation lines exterior to the ohmic contact rings of the individual circuit components and then flexing the scribed wafer to induce breaks along the scribed lines while inhibiting the formation of oxide cracks and fissures elsewhere in the wafer.

For a more complete understanding of the present invention, reference should be had to the following specification and to the appended figures of which:

Figures 1, 2, 3, 4, 5:
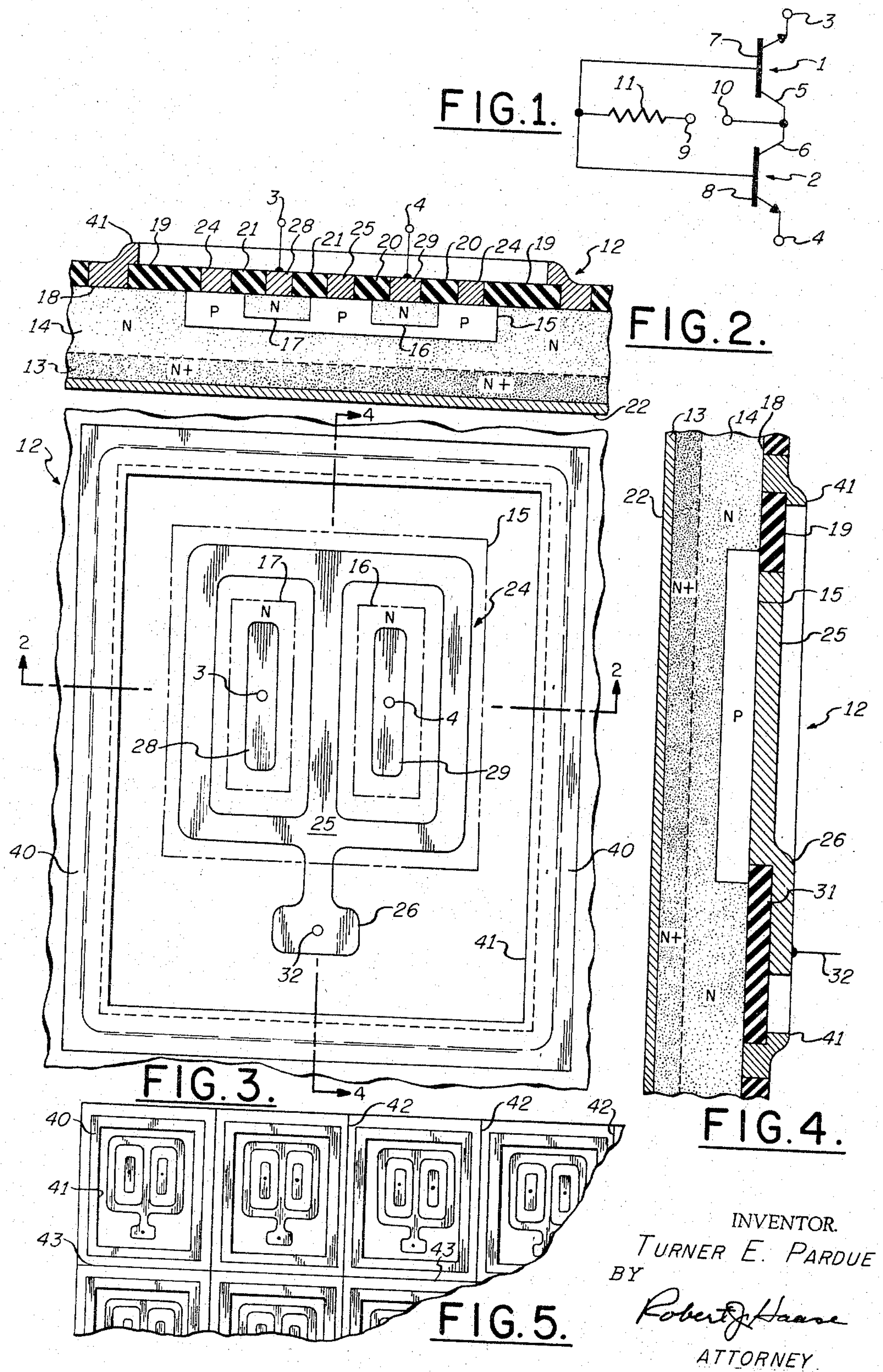
FIG. 1 is a schematic representation of a transistorized circuit functionally similar to a representative microelectronic circuit which may be separated from a parent wafer in accordance with the method of the present invention.
FIG. 2 is a cross-sectional view of a microelectronic circuit functionally corresponding to the circuit of FIG. 1 and having the ring ohmic contact characteristic of the practice of the present invention.
FIG. 3 is a plan view of the circuit of FIG. 2.
FIG. 4 is a second cross-sectional view of the circuit of FIG. 2.
FIG. 5 is a plan view of a section of the parent wafer of semiconductive material showing a multiplicity of the devices of FIGS. 2–4 immediately prior to separation.

Referring to FIG. 1, transistors 1 and 2 comprise the active elements of an all-electronic switch for connecting terminal 3 to terminal 4 when the switch is in the closed condition and for disconnecting terminal 3 from terminal 4 when the switch is in the open condition. In order to achieve as near ideal symmetry and uniformity of characteristics as possible in the circuit represented in FIG. 1, it is preferable that transistors 1 and 2 having the interconnected bases 7 and 8 and interconnected collectors 5 and 6 be formed on a single wafer of semiconductive material as described in the aforementioned copending patent application S.N. 331,164. Moreover, it is convenient that a multiplicity of identical microelectronic circuit components such as represented by the functionally similar circuit of FIG. 1 be formed on a single parent wafer of semiconductive material at one time. A microelectronic circuit component functionally equivalent to the transistorized circuit of FIG. 1 is represented by FIGS. 2, 3 and 4. A multiplicity of such microelectronic components, prior to separation from the parent wafer is shown in FIG. 5.

Referring to FIGS. 2, 3 and 4, the microelectronic chopper circuit is fabricated on a single wafer 12 of semiconductive material such as silicon. Wafer 12 comprises a heavily N-doped substrate 13 and an N-doped epitaxial layer 14. By conventional masking and impurity diffusion techniques, a single collector junction 15 and two emitter junctions 16 and 17 are produced in the wafer. Each of the junctions 15, 16 and 17 extends to the surface 18 of wafer 12 but is protected from contamination by protective layers 19, 20 and 21. The protective material preferably is silicon dioxide which may be formed on the surface of the semiconductive wafer by exposure to steam or oxygen. The protective layers are etched away from the surface of the wafer where ohmic contacts are to be deposited. A collector ohmic contact is provided by thin metallic layer 22 which is deposited on the bottom surface of substrate 13.

At the same time that the insulating layer of silicon dioxide is etched away from the wafer top surface 18 in preparation for the base and emitter ohmic contact deposition, the insulating layer also is removed about the closed path 40. Ohmic contact material such as, for example, aluminum, then is evaporated over the entire top surface of the wafer. Excess aluminum is selectively removed from non-wanted areas by suitable masking and etching. The aluminum is permitted to remain in ohmic contact with the silicon wafer in the base area 25, in the emitter areas 28 and 29 and in the closed ring area 40. Additional aluminum is allowed to remain to form a tab 26 extending from the base contact 25 over the oxide layer 31. External circuit connection to the base of each transistor is made via tab 26. Oxide layer 31 prevents the aluminum tab from short circuiting the underlying base-to-collector junction 15. The aluminum ring member 40 is provided with a raised shoulder portion 41 deposited over oxide layer 19 as shown in the cross-sectional views of FIGS. 2 and 4. Thus, the aluminum ring 40 includes a main outer portion in ohmic contact with the silicon wafer and a smaller interior portion in contact with the silicon oxide layer. The aluminum ring 40 soundly adheres both to the bare wafer and to the oxide layer.

A large number of identical microelectronic circuit components such as the chopper represented by FIGS. 2, 3 and 4 are produced at one time on a single parent wafer as shown in FIG. 5. The individual components are separated by scribing the surface of the parent wafer along lines 42 and along transverse lines 43 to divide the parent wafer in checkerboard fashion. Each of the lines 42 and 43 are scribed approximately midway between adjacent ring members 40 of the individual components. After the lines have been scribed, the entire parent wafer is subjected to a flexing pressure, as by passing the wafer between a roller and a belt in pressure contact with the roller. The flexing action causes the scribed wafer to break along the scribed lines. It has been found that the aluminum ring member 40 protects each of the microelectronic circuit components against damage to the oxide protective layer or to the wafer body interior to the ring during the scribing, flexing and breaking operations. The result is a substantial increase in the yield of individual components without any significant increase in the cost, complexity or time involved in the component fabrication process. In certain applications such as for example, where it is desired to mount the individual microelectronic circuit components on a ceramic substrate, the ring ohmic contact 40 may be used as a collector contact in lieu of the metallic layer 22.

The techniques employed in the production of the microelectronic devices on a single parent wafer are of no particular concern to the practice of the present invention. For example, the devices may be formed by the repetitive use of a standard procedure comprising the operations briefly discussed next. The silicon wafer is oxidized with oxygen or steam and the resulting oxidized layer is covered with a photo-resist. The photo-resist is exposed through the appropriate mask in those surface areas where the silicon dioxide layer is to remain. When the photo-resist is developed, the developer removes the photo-resist in areas which had not been exposed. The residual exposed photo-resist then is hardened to withstand the subsequent acid etch treatment. The etch removes the oxide layer in the areas unprotected by photoresist. The remaining oxide provides a mask against the diffusion of impurities into the silicon wafer. Then, the exposed areas of the silicon wafer are diffused with an impurity to produce the transistor base regions. Upon the completion of the base region diffusion, new oxide is grown over the surface of the wafer and the above-described steps are repeated for the formation of the two emitter regions within the common base region. Finally, after the emitter regions have been produced, the oxide layer is reformed to expose areas of the wafer in the shape of the base and emitter ohmic contacts and in the shape of the protective ring ohmic contact 40.

Then, aluminum is deposited to produce the base and emitter ohmic contacts and the protective ring member 40.

It will be understood, of course, that the method of the present invention, by which individual microelectronic components are separated from a parent wafer, is not restricted to the production of the disclosed microelectronic chopper circuit but is widely applicable to the multiple making of individual elements such as diodes and transistors as well as monolithic circuits including them.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. The method of separating individual components from an oxide-coated single parent wafer of semiconductor material comprising removing the oxide layer from the surface of said wafer along substantially closed paths about the perimeter of each component on said wafer, depositing on each said path a substantially closed ring of ohmic contact material wider than said path so that said material adherently contacts both said wafer and said oxide layer interior to said ring, scribing lines upon the surface of said wafer between said rings, and flexing said wafer so as to break said wafer along said lines.

2. The method of separating individual components from an oxide-coated single parent wafer of semiconductor material comprising removing the oxide layer from the surface of said wafer along substantially closed paths about the perimeter of each component on said wafer, depositing on each said path a substantially closed ring of ohmic contact material wider than said path so that said material adherently contacts both said wafer and said oxide layer interior to said ring, scribing lines upon the surface of said wafer between said rings, and breaking said wafer along said lines.

3. The method of separating individual components from an oxide-coated single parent wafer of semiconductor material comprising removing the oxide layer from the surface of said wafer along substantially closed paths about the perimeter of each component on said wafer, covering each said path with protective material in adherent contact with said wafer and said oxide layer, said protective material being wider than said path so that said protective material adherently contacts both said wafer and said oxide layer interior to said protective material, scribing lines upon the surface of said wafer between said paths, and breaking said wafer along said lines.

References Cited

UNITED STATES PATENTS

| | | | |
|---|---|---|---|
| 2,814,853 | 12/1957 | Paskell | 29—155.5 |
| 2,970,730 | 2/1961 | Schwarz | 225—2 |
| 2,978,804 | 4/1961 | Soper et al. | 225—2 X |
| 2,989,426 | 6/1961 | Rutz | 29—155.5 |
| 3,040,489 | 6/1962 | DaCosta | 225—2 X |
| 3,078,559 | 2/1963 | Thomas | 29—155.5 X |
| 3,124,640 | 3/1964 | Armstrong | 29—155.5 |

ANDREW R. JUHASZ, *Primary Examiner.*

DONALD L. MAXSON, JAMES MEISTER, *Examiners.*